(12) United States Patent
Fletcher et al.

(10) Patent No.: US 10,228,002 B2
(45) Date of Patent: Mar. 12, 2019

(54) CLAMP SYSTEM

(71) Applicants: Robert Douglas Fletcher, Mentor, OH (US); Dean Michael Maron, Painesville, OH (US)

(72) Inventors: Robert Douglas Fletcher, Mentor, OH (US); Dean Michael Maron, Painesville, OH (US)

( * ) Notice: Subject to any disclaimer, the term of this patent is extended or adjusted under 35 U.S.C. 154(b) by 0 days.

(21) Appl. No.: 15/701,376

(22) Filed: Sep. 11, 2017

(65) Prior Publication Data

US 2018/0073530 A1    Mar. 15, 2018

Related U.S. Application Data

(60) Provisional application No. 62/385,800, filed on Sep. 9, 2016.

(51) Int. Cl.
| | | |
|---|---|---|
| *F16B 2/10* | (2006.01) | |
| *F16M 13/02* | (2006.01) | |
| *F16B 7/04* | (2006.01) | |

(52) U.S. Cl.
CPC .............. *F16B 2/10* (2013.01); *F16M 13/022* (2013.01); *F16B 7/0493* (2013.01)

(58) Field of Classification Search
CPC .......... F16B 2/10; F16B 2/12; F16M 13/022; F16M 13/02; F16M 2200/06; F16M 2200/061; F16M 11/28; A45B 1/00; A45F 5/00; F21V 21/08; F21V 21/088; A61G 13/101
USPC ... 248/231.51, 230.4, 228.4, 229.23, 229.13, 248/276.1, 278.1, 282.1, 284.1, 316.1, 248/316.5, 316.6, 228.5, 230.5, 231.61, 248/229.24, 229.14
See application file for complete search history.

(56) References Cited

U.S. PATENT DOCUMENTS

| | | | | |
|---|---|---|---|---|
| 577,156 | A * | 2/1897 | Bragger | A24F 19/0092 248/230.4 |
| 597,947 | A * | 1/1898 | Bragger | A24F 19/0092 248/230.4 |
| 600,535 | A * | 3/1898 | Homan | A41F 11/02 24/517 |
| 614,347 | A * | 11/1898 | Rhino | A24F 19/0092 248/230.4 |
| 1,153,320 | A * | 9/1915 | Klenck | A47G 25/0607 248/217.1 |

(Continued)

*Primary Examiner* — Nkeisha Smith
(74) *Attorney, Agent, or Firm* — Jessica H. Fross; Fross Legal Services (57) ABSTRACT

This disclosure describes a clamp system comprised of: (i) a first jaw having two matching notched edges and a first cylindrical opening; (ii) a second jaw having two matching curved edges and a second cylindrical opening, wherein the second jaw and the first jaw are not the same length or width; (iii) at least one pivot pin; (iv) a long fastening element, preferably a long socket cap screw; (v) a plurality of short fastening elements, preferably short socket cap screws; (vi) a primary affixing element, preferably a threaded stud; (vii) optionally, a secondary affixing element, preferably a flanged nut; (viii) a plurality of washers and/or (ix) a plurality of retaining rings, (x) optionally, a rubber coating or covering on the first jaw and the second jaw; and, in one embodiment, both (xi) a compound swivel; and, (xii) a compound knuckle.

18 Claims, 9 Drawing Sheets

(56) References Cited

U.S. PATENT DOCUMENTS

| | | | | |
|---|---|---|---|---|
| 1,309,360 | A * | 7/1919 | Klorer | B25G 3/38 248/207 |
| 1,895,156 | A * | 1/1933 | Fisher | B01L 9/50 248/122.1 |
| 1,911,380 | A * | 5/1933 | McFarlin | H01B 17/16 174/158 R |
| 2,080,527 | A * | 5/1937 | Bixel | B60R 9/02 182/127 |
| 4,470,106 | A * | 9/1984 | Norton | F16M 11/10 248/278.1 |
| 5,176,350 | A * | 1/1993 | McQuistian | G12B 5/00 248/231.51 |
| 6,264,152 | B1 * | 7/2001 | Bloch | F16M 11/126 248/274.1 |
| 6,283,425 | B1 * | 9/2001 | Liljevik | H01Q 1/125 248/218.4 |
| 6,592,090 | B1 * | 7/2003 | Li | F16M 11/2092 248/284.1 |
| 7,408,526 | B2 * | 8/2008 | Pan | H01Q 1/125 343/880 |
| 7,954,777 | B2 * | 6/2011 | Bohm | F16M 11/10 248/274.1 |
| 7,971,840 | B2 * | 7/2011 | Hirschhorn | F16M 11/041 248/123.11 |
| 8,011,627 | B2 * | 9/2011 | Andkjar | B62J 11/00 248/214 |
| 8,020,823 | B2 * | 9/2011 | Wang | F16M 11/12 248/278.1 |
| 8,196,883 | B2 * | 6/2012 | Hirschhorn | F16M 11/041 248/274.1 |
| 8,756,771 | B1 * | 6/2014 | Moreau | F16B 2/10 24/517 |
| 8,800,941 | B2 * | 8/2014 | Kahn | A46B 17/02 248/110 |
| 8,820,686 | B2 * | 9/2014 | Hickle | A62C 35/68 248/229.13 |
| 9,206,943 | B2 * | 12/2015 | Chang | A45B 3/00 |
| 9,328,864 | B1 * | 5/2016 | Ho | F16M 13/022 |
| 9,478,845 | B2 * | 10/2016 | Hemmervall | F16B 5/0233 |
| 2009/0072108 | A1 * | 3/2009 | Oleson | F04D 25/088 248/282.1 |
| 2016/0294036 | A1 * | 10/2016 | Christie | F16M 13/022 |
| 2016/0296401 | A1 * | 10/2016 | Cole | A61G 13/101 |

* cited by examiner

CLAMP SYSTEM

CROSS-REFERENCE TO RELATED APPLICATION

The Applicant claims priority to U.S. Provisional Patent Application Ser. No. 26/887,189, filed Sep. 9, 2016, the disclosure of which is expressly incorporated by reference herein.

FIELD OF THE INVENTION

This invention relates to clamp systems for mounting objects or accessories to surfaces.

BACKGROUND OF THE INVENTION

Vehicles with roll bars frequently require the attachment of accessories, objects, or removable components for safe or convenient operation. "Roll bar" means a bar or bars extending around a vehicle in any direction. Roll bars can be part of a roll cage and are often found in motor sport vehicles for the purpose of strengthening the vehicle's frame, and protecting occupants from injury during collision or vehicle overturn. "Vehicle" means any instrument or means of travel or transportation, including but not limited to: helicopters, drones, remotely operated vehicles, automobiles, all-terrain vehicles (ATV), neighborhood electric vehicles (NEV), tractors, motorboats, boats, naval vehicles, motorcycles, golf carts, Go Karts, buggies, carriages, trailers, dollys, bicycles, and the like.

Accessories which attach to vehicles can include lamps or light fixtures, weapons or firearms, cameras, surveying equipment, mirrors, signs, flags, or other similar objects. Examples of the attachment of such accessories are illustrated in the following patents or published applications: Sacknoff U.S. Pat. No. 4,818,088 (system for mounting a side mirror onto a vehicle), Morford U.S. Pat. No. 5,350,094 (system for mounting firearms onto a vehicle), McHugh U.S. Pat. No. 5,450,296 (system for mounting lamps onto a rotatable rod), Walker U.S. Pat. No. 6,179,180 (system for carrying cylindrical articles on a recreational vehicle), Woods United States Patent Application No. 20120180643 (system for mounting weapons onto a vehicle), Miller U.S. Pat. No. 8,905,282 (system for mounting a weapon onto a vehicle), Jordan U.S. Pat. No. 9,050,936 (system for mounting accessories onto a boat tower or tow pylon), Jaramillo World Intellectual Property Organization Patent No. 2015033188 (system for mounting a high caliber firearm onto an air, naval, or land vehicle), and Rauschert U.S. Pat. No. 9,475,432 (system for mounting accessories onto a vehicle door hinge).

The average person wishing to attach an accessory to their vehicle may struggle to identify compatible hardware for attachment, or may struggle to successfully, safely, and appropriately attach their accessory. Certain accessories require specific skills, knowledge, or equipment for attachment or subsequent removal. Hiring a third-party for attachment or removal can be prohibitively expensive and outweigh the value of the accessory. When attached correctly, some accessory mount assemblies are inherently unstable and are prone to vibrate, break, detach, or otherwise fail during vehicle operation. Stability and durability are especially essential for the attachment of accessories to vehicles which travel over uneven terrain or through unimproved environments.

It is also desirable to attach objects or accessories to structural or engineered frameworks such as trusses, canopies, and the like. "Frameworks" means any supporting structure on a building, vehicle, furniture, or object. Consider individuals utilizing space at concerts, festivals, convention centers, flea markets, or church gatherings, who desire to attach signs, light fixtures, flags, merchandise, electrical equipment, lawncare equipment, fire extinguishers, first aid kits, speakers, radios, cup holders, or other objects to their tables, chairs, tents, cables, fencing, decorative or supportive architectural building detail, and the like. Rods, posts, poles, beams, rails, and struts are made of varying materials and exist in varying sizes and shapes; although, generally in cylindrical or rectangular designs. It can be difficult for the average person to identify the most suitable device, material, or assembly to affix objects to any of the aforementioned structures; this is especially true when the object exceeds one pound or may be subject to inclement weather conditions, abrasive chemicals, or extreme temperatures.

Accordingly, there is a need for an industrial-strength clamp system that is sturdy, durable, inexpensive, convenient to attach and to remove, adjustable, and designed to accommodate vehicle roll bars, frameworks, structures, accessories, and other objects of varying materials, sizes, and shapes.

SUMMARY OF THE INVENTION

This industrial-strength clamp resolves deficiencies of the prior art because it is uniquely adapted to securely and efficiently fasten a multitude of objects or accessories onto vehicles, structures, frameworks, and surfaces. This clamp may be utilized temporarily or permanently, as desired. It is adjustable and capable of firmly grasping circular, cylindrical, rectangular, or square objects or accessories. The clamp may optionally include a rubber coating or covering to protect an accessory or object, and improve clamp grip.

More specifically, this disclosure includes a clamp system comprising: (i) a first jaw having two matching notched edges and a first cylindrical opening; (ii) a second jaw having two matching curved edges and a second cylindrical opening; wherein, the width of the second jaw is less than the width of the first jaw, the length of the second jaw is less than the length of the first jaw, and therefore, the second jaw fits within the first jaw; (iii) a moving jaw pivot pin within the second jaw; (iv) a long socket cap screw; wherein the long socket cap screw extends through the first cylindrical opening of the first jaw, through the moving jaw pivot pin, and through the second cylindrical opening of the second jaw; and, wherein the long socket cap screw controls the movement of the second jaw; (v) a compound knuckle having a first engaging surface, a second engaging surface, a third engaging surface, and a fourth engaging surface; wherein the width of the first jaw is less than the width of the compound knuckle, and the first jaw fits within and is positioned between the third engaging surface and the fourth engaging surface of the compound knuckle; (vi) a compound swivel, which may rotate between the first engaging surface and the second engaging surface of the compound knuckle; wherein the width of the compound swivel is less than the width of the compound knuckle; (vii) a primary affixing element; wherein, the primary affixing element is connected to the compound swivel; (viii) optionally, a secondary affixing element; wherein the secondary affixing element is connected to the primary affixing element; (ix) a first short socket cap screw; (x) a second short socket cap screw;

wherein the first short socket cap screw and the second short socket cap screw connect the compound swivel to the first engaging surface and to the second engaging surface, respectively; (xi) a third short socket cap screw; (xii) a fourth short socket cap screw; wherein the third short socket cap screw and the fourth short socket cap screw connect the first jaw and the second jaw to the third engaging surface and to the fourth engaging surface, respectively; (xiii) a moving jaw pivot pin, connected to the compound swivel and to the compound knuckle by the first short socket cap screw and the second short socket cap screw; (xiv) a threaded stud, (xv) a flanged nut; wherein the threaded stud and the flanged nut may optionally be used to affix the compound swivel to any surface (xvi) a second compound knuckle pivot pin, connected to the first jaw, to the second jaw, to the compound knuckle, and to the compound swivel, by the third short socket cap screw and the fourth short socket cap screw; (xvii) a spacer, between the first engaging surface and the second engaging surface of the compound knuckle; wherein the spacer at least partially covers the moving jaw pivot pin, the first short socket cap screw, and the second short socket cap screw; and, optionally, (xviii) a plurality of washers.

Additionally, this disclosure describes a clamp system comprising: (i) a first jaw having two matching notched edges and a first cylindrical opening; (ii) a second jaw having two matching curved edges and a second cylindrical opening; wherein, the width of the second jaw is less than the width of the first jaw; (iii) a moving jaw pivot pin within the second jaw; (iv) a long fastening element; wherein the long fastening element extends through the first cylindrical opening of the first jaw, through the moving jaw pivot pin, and through the second cylindrical opening of the second jaw; wherein the long fastening element operates the second jaw; (v) a compound knuckle having a first engaging surface, a second engaging surface, a third engaging surface, and a fourth engaging surface; (vi) a compound swivel; (vii) a compound knuckle having a first engaging surface, a second engaging surface, a third engaging surface, and a fourth engaging surface; wherein the width of the compound knuckle is greater than both the width of the compound swivel and the width of the first jaw; (vii) a first compound knuckle pivot pin; wherein the compound swivel and the first compound knuckle pivot pin are connected to the first engaging surface and to the second engaging surface of the compound knuckle by a plurality of short fastening elements and, optionally, washers; (viii) a spacer, covering a portion of the first compound knuckle pivot pin; and, (ix) a second compound knuckle pivot pin, wherein the first jaw, the second jaw, and the second compound knuckle pivot pin are connected to the third engaging surface and to the fourth engaging surface of the compound knuckle by a plurality of short fastening elements and, optionally, washers.

This disclosure further provides for a clamp system comprising: (i) a first jaw having two matching notched edges and a first cylindrical opening; (ii) a second jaw having two matching curved edges and a second cylindrical opening; wherein the width of the second jaw is less than the width of the first jaw, and the second jaw fits within the first jaw; (iii) a moving jaw pivot pin located within the second jaw; (iv) a long socket cap screw, wherein the long socket cap screw extends through the first cylindrical opening of the first jaw, through the moving jaw pivot pin, and through the second cylindrical opening of the second jaw; and wherein the long socket cap screw controls the movement of the second jaw; (v) a washer, located between the long socket cap screw and the outer surfer of the first jaw; (vi) a tube pivot pin, connected to the first jaw and to the second jaw; and, (vii) a plurality of retaining rings; wherein the retaining rings secure the tube pivot pin within the first jaw and the second jaw.

This disclosure also includes a clamp system comprising: (i) a first jaw having two matching notched edges and a first cylindrical opening; (ii) a second jaw having two matching curved edges and a second cylindrical opening; wherein, the width of the second jaw is less than the width of the first jaw; wherein the length of the first jaw is greater than the length of the second jaw; (iii) a moving jaw pivot pin within the second jaw; (iv) a long fastening element; wherein the long fastening element extends through the first cylindrical opening of the first jaw, through the moving jaw pivot pin, and through the second cylindrical opening of the second jaw; wherein the long fastening element operates the second jaw; (v) a second compound knuckle pivot pin, connected to the first jaw and to the second jaw; and, (vi) a plurality of retaining rings.

DETAILED DESCRIPTION OF THE INVENTION

Figure 1:
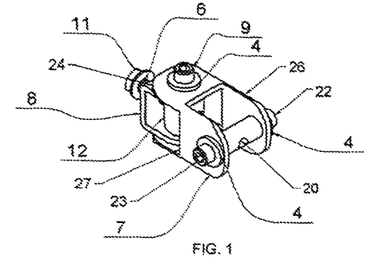
FIG. 1 shows components of the first embodiment of this clamp.
Figure 2:
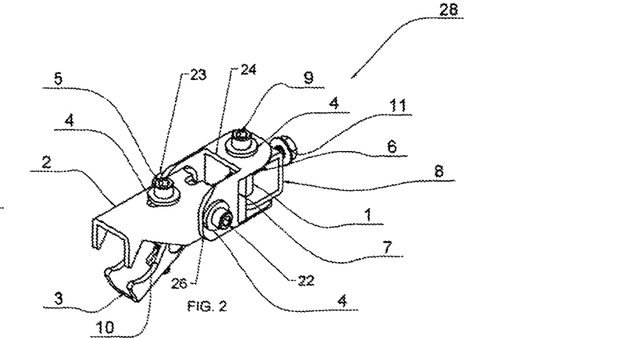
FIG. 2 depicts the first embodiment of this clamp.

FIG. 1 shows a compound swivel 8 and a compound knuckle 7 (also known as a dual pivot bracket). The compound swivel 8 is smaller than the compound knuckle 7 and fits between a first engaging surface 24 and a second engaging surface 25 on the compound knuckle 7. Both the compound swivel 8 and the compound knuckle 7 are generally made of steel, but may be made of iron, or specifically a stainless steel, high quality carton steel, or any other suitable industrial-strength material. Typically, the compound swivel 8 and the compound knuckle 7 are between 0.10 of an inch and 1.0 inch thick. For added strength and stability, a spacer 12 is internally located between the engaging surfaces of the compound swivel 8. The spacer 12 is secured by a first short fastening element 9, preferably a short socket cap screw, and a second short fastening element 21, preferably a short socket cap screw. A first compound knuckle pivot pin 1 is secured within the spacer 12 by the first short fastening element 9 and the second short fastening element 21. In FIG. 2, the first compound knuckle pivot pin 1 is visible and the spacer 12 is not shown. It is preferred that a washer 4, ideally a flat washer, rests on the external surface of the compound knuckle 7, between the first short fastening element 9 and the first engaging surface 24. It is also preferred that a washer 4, ideally a flat washer, rests on the external surface of the compound knuckle 7, between the second short fastening element 21 and the second engaging surface 25.

Figure 19:
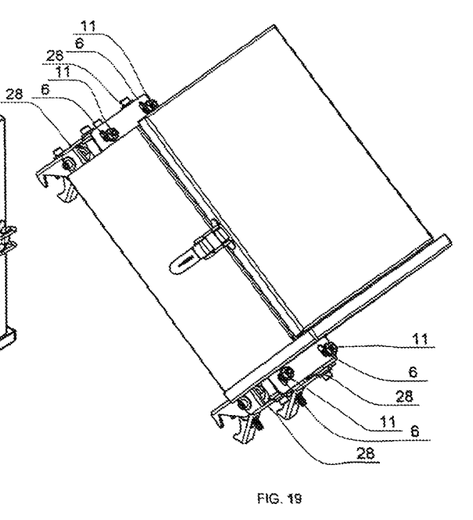
FIG. 19 is an alternate view of multiple first embodiments of this clamp attached to plates on a rectangular object.
Figures 20, 21:
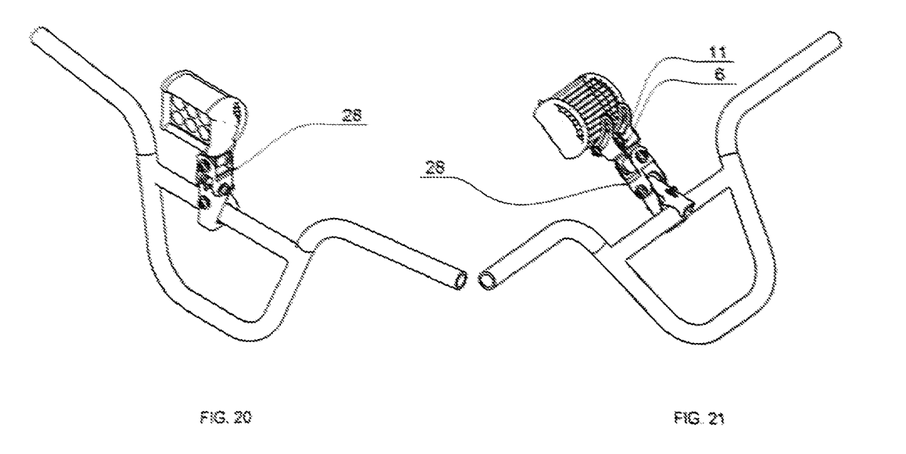
FIG. 20 is an example of the first embodiment of this clamp wherein the jaws are attached to a bar and the compound swivel is attached to an accessory light fixture.
FIG. 21 shows an alternate view of the first embodiment of this clamp, wherein the jaws are attached to a bar and the compound swivel is attached to an accessory light fixture.
Figure 22:
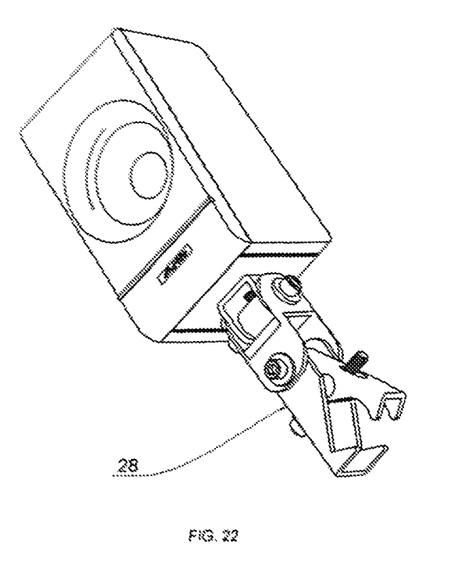
FIG. 22 illustrates the first embodiment of this clamp, wherein the compound swivel is attached to a speaker.
Figure 23:
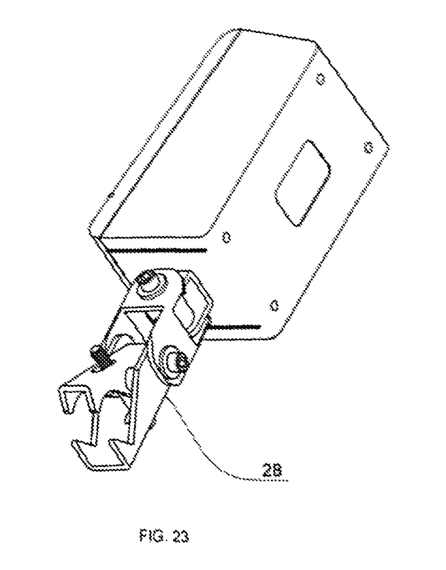
FIG. 23 shows an alternate view of the first embodiment of this clamp, wherein the compound swivel is attached to a speaker.

A primary affixing element 6, which may be a screw, a nail, a stud, or the like, is centrally located on a rectangular surface of the compound swivel 8. As shown in FIG. 19 and FIG. 21, the primary affixing element 6 is generally a threaded stud between 1.0 inch and 12.0 inches in length, with between 20 threads per 0.25 of an inch and 4 threads per 2.5 inches. As best shown in FIG. 19 and FIG. 21, a secondary affixing element 11, which may be a washer, a nut, or any other affixing element designed to assist, reinforce, or distribute pressure caused by the primary affixing element 6, is connected to the primary affixing element 6. The primary affixing element 6 and the secondary affixing element 11 function to secure the compound swivel 8 and the compound knuckle 7 to an external object, plate, building feature, and the like. As shown in FIG. 19 and FIG. 21, the secondary affixing element 11 is preferably a flanged nut and may have a wide flange which distributes pressure along the compound swivel 8; thereby reducing the likelihood of damage to the compound swivel 8 when attached to a surface (even or uneven). In some cases, it may be more appropriate to exclusively use a primary affixing element 6.

Figure 3:
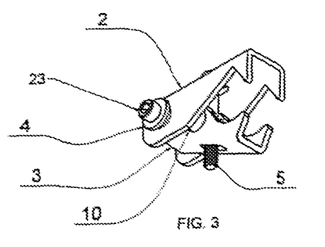
FIG. 3 illustrates the first jaw and the second jaw of the first embodiment of this clamp.
Figure 4:
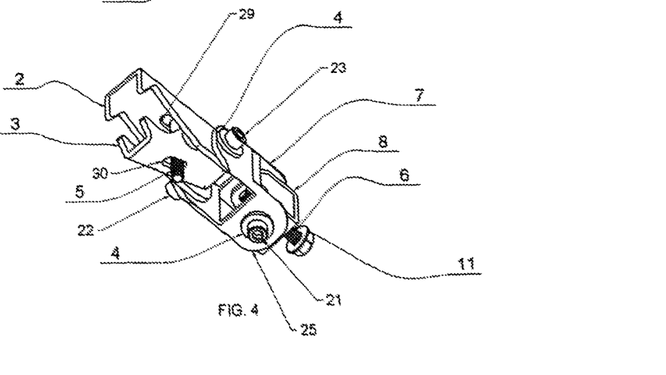
FIG. 4 shows an alternate view of a first embodiment of this clamp.
Figures 6, 7:
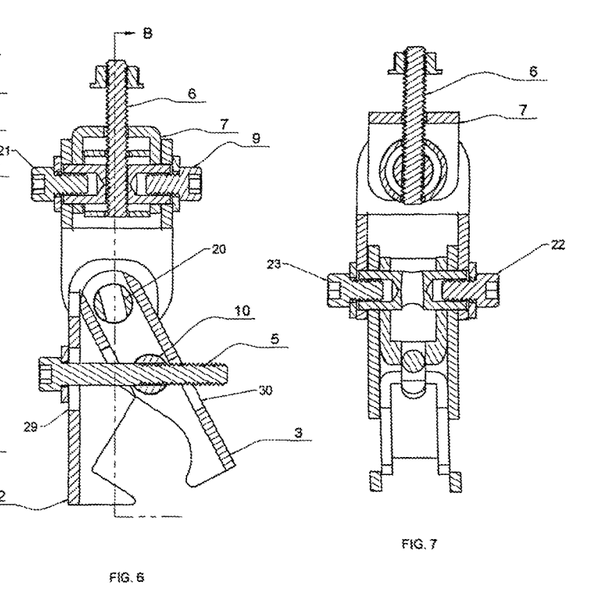
FIG. 6 is a cross-section of the first embodiment of this clamp.
FIG. 7 is a cross-section of an aerial view of the first embodiment of this clamp.

A second compound knuckle pivot pin 20 is secured to the compound knuckle 7 by a third short fastening element 22, preferably a short socket cap screw, fastened to a third engaging surface 26, and by a fourth short fastening element 23, preferably a short socket cap screw, fastened to a fourth engaging surface 27. In other words, the second compound knuckle pivot pin 20 is located between the third engaging surface 26 and the fourth engaging surface 27 of the compound knuckle 7. As best shown in FIG. 3 and FIG. 6, the second compound knuckle pivot pin 20 connects the compound knuckle 7 to both a first jaw 2 and a second jaw 3.

FIG. 2, FIG. 4, FIG. 5, FIG. 6, FIG. 7, FIG. 10, FIG. 11, FIG. 17, FIG. 18, FIG. 19, FIG. 20, FIG. 21, FIG. 22, and FIG. 23 show multiple perspectives of a first embodiment of the clamp 28, which is generally powder coated black and textured. The clamp 28 includes the compound swivel 8 and the compound knuckle 7 described and shown in FIG. 1, and the first jaw 2 and the second jaw 3 described and shown in FIG. 3. The primary affixing element 6 and the secondary affixing element 11 and connected to the compound swivel 8 and serve to attach the clamp 28 to any surface, including a plate. The compound swivel 8 and the compound knuckle 7 may move independently from one another. For example, the compound swivel 8 may move between the first engaging surface 24 and the second engaging surface 25 of the compound knuckle 7, and the compound knuckle 7 may move in the opposite direction and around the second compound knuckle pivot pin 20 located between the third engaging surface 26 and the fourth engaging surface 27 of the compound knuckle 7.

Figure 5:
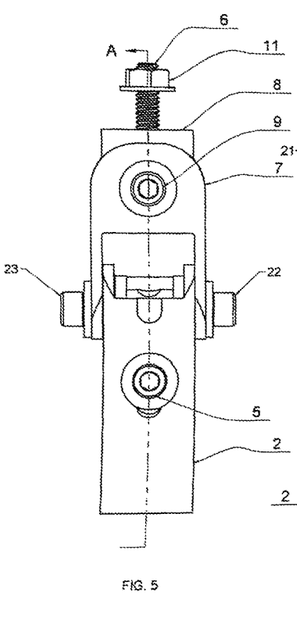
FIG. 5 is an aerial view of a first embodiment of this clamp.

As most clearly shown in FIG. 5, FIG. 6, and FIG. 7, both the third short fastening element 22 and the fourth short fastening element 23 connect the compound knuckle 7 to the first jaw 2 and to the second jaw 3; and, they 22, 23 secure the second compound knuckle pivot pin 20 between the third engaging surface 26 and the fourth engaging surface 27 of the compound knuckle 7. This design allows the compound knuckle 7 to move independently from the first jaw 2 and the second jaw 3. As best shown in FIG. 2, it is preferred that a washer 4, ideally a flat washer, rests on the external surface of the compound knuckle 7, between the third short fastening element 22 and the third engaging surface 26. As best shown in FIG. 1, it is also preferred that a washer 4, ideally a flat washer, rests on the external surface of the compound knuckle 7, between the fourth short fastening element 23 and the fourth engaging surface 27.

The first jaw 2 is generally between 2.0 inches and 12.0 inches wide. In some instances, the first jaw 2 is between 4.0 inches and 10.0 inches wide. Frequently, the first jaw 2 is between 6.0 inches and 8.0 inches wide. The width of the compound knuckle 7 is slightly wider than the width of the first jaw 2. The first jaw 2 fits within the third engaging surface 26 and the fourth engaging surface 27 of the compound knuckle 7. The first jaw 2 and the second jaw 3 are generally made of steel, but may be made of iron, or specifically a stainless steel, high quality carton steel, or any other suitable industrial-strength material. Typically, the first jaw 2 and the second jaw 3 are each between 0.10 of an inch and 1.0 inch thick. More often, the first jaw 2 and the second jaw 3 are each between 0.10 of an inch and 0.50 of an inch thick. Preferably, the first jaw 2 and the second jaw 3 are each between 0.10 of an inch and 0.25 of an inch thick. Optionally, the first jaw 2 and the second jaw 3 may include a rubber cover or coating to improve the grip of the jaws 2, 3.

As best shown in FIG. 2 and FIG. 6, a long fastening element 5, preferably a long socket cap screw, further connects the first jaw 2 to the second jaw 3. As its name suggests, the long fastening element 5 is longer than the aforementioned short fastening elements 1, 21, 22, 23. The long fastening element 5 is long enough to extend through both the first jaw 2 and the second jaw 3 when they are extended and apart from one another, as best shown in FIG. 6. When fully extended, the greatest distance between the internal surface of the first jaw 2 and the internal surface of the second jaw 3 is usually less than 10.0 inches; this distance is also known as the jaw opening capacity. Typically, the greatest distance between the internal surface of the first jaw 2 and the internal surface of the second jaw 3 is less than 7.0 inches. When the jaws 2, 3 are empty and in a closed position, the combined height of the jaws 2, 3, measuring from their internal surfaces, is about 25% of the total length of the clamp 28. In other words, the length of the clamp 28 is approximately four times greater than the approximate height of the clamp 28.

The long fastening element 5 passes from the first jaw 2 to the second jaw 3 and through a moving jaw pivot pin 10 within the second jaw 3; the long fastening element 5 is perpendicular to the moving jaw pivot pin 10. The moving jaw pivot pin 10 is shorter than both the first compound knuckle pivot pin 1 and the second compound knuckle pivot pin 20. The moving jaw pivot pin 10 aids the long fastening element 5 in opening and closing the jaws 2, 3 of the clamp 28.

The long fastening element 5 serves to adjust the second jaw 3 to hold or release one or more objects, accessories, or components of varying shapes or thicknesses. As most clearly shown in FIG. 4 and FIG. 6, the long fastening element 5 pivots in a direction that is limited by two similarly aligned cylindrical openings; a first opening 29 is located on the first jaw 2, and a second opening 30 is located on the second jaw 3. Said openings 29, 30 are about the same width as the long fastening element 5, and the length of the openings 29, 30 is less than the length of the long fastening element 5. Because the jaws 2, 3 are primarily opened or closed by adjusting the long fastening element 5, the first jaw 2 is considered a fixed or non-moving part, and the second jaw 3 is considered a moving part. The long fastening element 5 may optionally be fitted with a handle to allow for quick adjustment of the jaws 2, 3.

The second jaw 3 is smaller than the first jaw 2, both in length and in width, and for this reason the second jaw 3 is able to nestle within the first jaw 2. The second jaw 3 may be between 5% and 50% smaller than the first jaw 2. Typically, the second jaw 3 is between 15% and 40% smaller than the first jaw 2. Most often, the second jaw 3 is between 20% and 30% smaller than the first jaw 2. The first jaw 2 may include a plurality of teeth or rounded points at the edge of the jaw 2 furthest from the center of the clamp 28, and the second jaw 3 may also include a plurality of teeth or rounded points at the edge of the jaw 3 furthest from the center of the clamp 28. The jaws 2, 3 of the clamp 28 generally each include two teeth or rounded points, but may have fewer or more teeth or rounded point as deemed necessary, appropriate, or beneficial for the clamp 28 to hold an accessory or object.

It is preferred that the first jaw 2 include two matching 90-degree notches, although any angle below 180 degrees may be appropriate, to accommodate grasping edges, such as those found on rectangular or square shaped objects or accessories; and, it is preferred that the second jaw 3 include two matching curved surfaces to accommodate grasping objects or accessories which lack edges, such as cylindrical or circular objects or accessories. The radius of the curvature of the second jaw 3 is generally between 1.0 inch and 6.0 inches; most often, the radius is between 2.0 inches and 5.0 inches. Preferably the radius of the curvature of the second jaw 3 is between 3.0 inches and 4.0 inches. The radius or diameter of the curvature of the second jaw 3 roughly limits the radius or diameter of the cylindrical or circular accessory or object that the clamp 28 may hold. For example: if the radius of the curvature of the second jaw 3 is 2.0 inches, then the clamp 28 may hold a cylindrical or circular accessory or object with a radius of 2.0 inches or less.

The jaws 2, 3 are designed as described so that they 2, 3 may hold objects or accessories having or lacking edges. As best shown in FIG. 10, FIG. 11, FIG. 20, and FIG. 21 the jaws 2, 3 are adapted to hold rectangular or cylindrical objects of varying dimensions.

Figure 18:
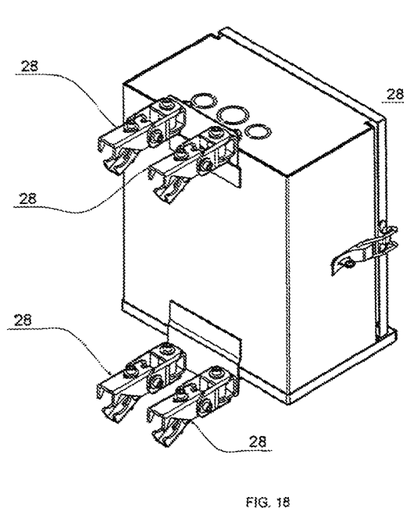
FIG. 18 shows multiple first embodiments of this clamp attached to plates on a rectangular object.

This clamp 28 is designed to hold and carry one or more objects, accessories, or components weighing a total of up to 200 pounds. More specifically, the clamp 28 is intended to hold and carry one or more objects, accessories, or components weighing between 70 pounds and 150 pounds in total. Most specifically, this clamp 28 is intended to hold and carry one or more objects, accessories, or components weighing between 85 pounds and 100 pounds. By increasing or decreasing the size of this clamp 28, it is possible that the clamp 28 would be able to hold and carry one or more objects, accessories, or components having total weights outside of the aforementioned listed ranges. As shown in FIG. 18 and FIG. 19, multiple clamps 28 may be used to hold and carry objects, accessories, or components weighing more than the carrying capacity of a single clamp 28.

FIG. 8, FIG. 9, FIG. 12, FIG. 13, FIG. 14, FIG. 15, and FIG. 16 show a second embodiment of the clamp 33. The second embodiment includes a first jaw 15 and a second jaw 16. The first jaw 15 and second jaw 16 are generally made of steel, but may be made of iron, or specifically a stainless steel, high quality carton steel, or any other suitable industrial-strength material. The first jaw 15 is tube-shaped. The tube body of the first jaw 15 can extend as long as desired, and may include bends or curves; and, a single tube body can include multiple second jaw units and their corresponding parts. The first jaw 15 is considered a fixed or non-moving part, and the second jaw 16 is considered a moving part. A long fastening element 14, preferably a long socket cap screw, connects the first jaw 15 to the second jaw 16 and controls the movement of the second jaw 16. The long fastening element 14 can optionally include a handle for quick adjustment. It is preferred that a washer 13, ideally a flat washer, rests between the long fastening element 14 and the external surface of the first jaw 15. The long fastening element 14 is long enough to extend through both the first jaw 15 and the second jaw 16 when they are extended and apart from one another. When fully extended, the greatest distance between the internal surfaces of the first jaw 15 and the second jaw 16 is usually less than 10.0 inches; and, this distance is also known as the jaw opening capacity. Typically, the greatest distance between the internal surface of the first jaw 15 and the internal surface of the second jaw 16 is less than 7.0 inches. Preferably, the greatest distance between the internal surface of the first jaw 15 and the internal surface of the second jaw 16 is between 2.0 inches and 6.0 inches.

Figure 9:
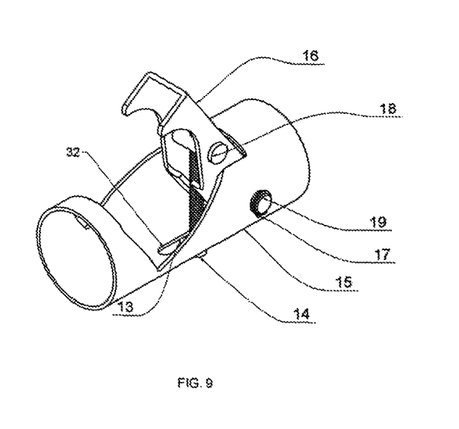
FIG. 9 shows an alternate view of the second embodiment of this clamp.
Figure 10:
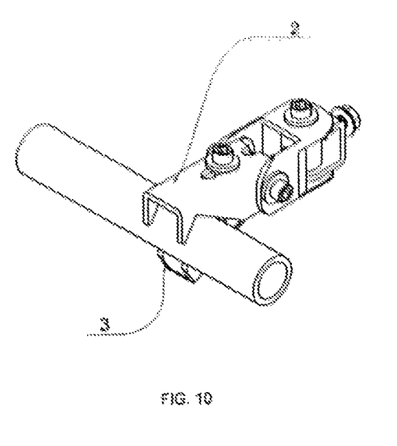
FIG. 10 illustrates the first embodiment of this clamp holding a cylindrical or circular object or accessory.
Figure 11:
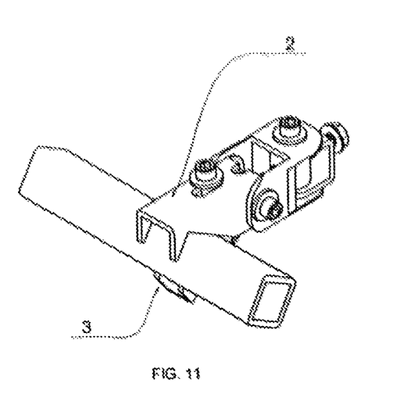
FIG. 11 shows the first embodiment of this clamp holding a rectangular or square object or accessory.
Figures 12, 13, 14, 15, 16:
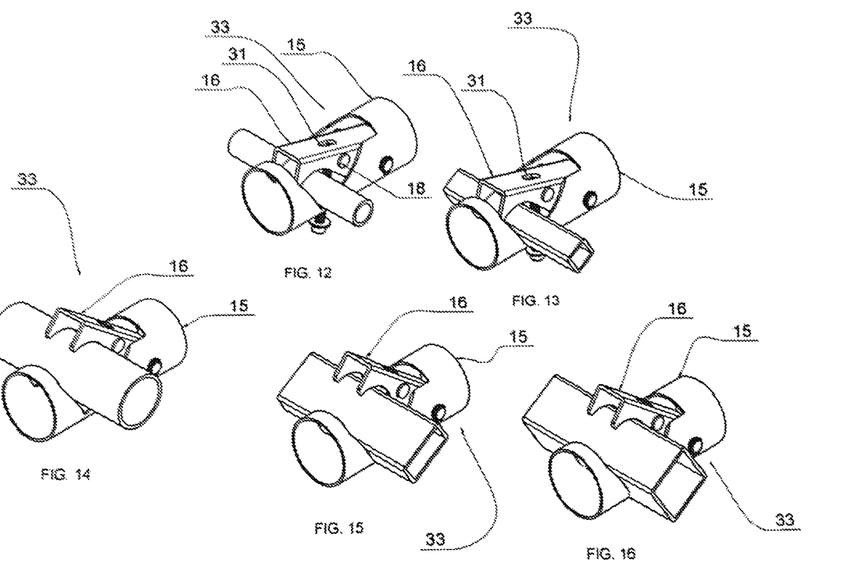
FIG. 12 illustrates the second embodiment of this clamp holding a small cylindrical or circular object or accessory.
FIG. 13 depicts the second embodiment of this clamp holding a small rectangular or square object or accessory.
FIG. 14 shows the second embodiment of this clamp holding a large cylindrical or circular object or accessory.
FIG. 15 demonstrates the second embodiment of this clamp holding a large rectangular object or accessory.
FIG. 16 shows the second embodiment of this clamp holding a second large rectangular or square object or accessory.
Figure 17:
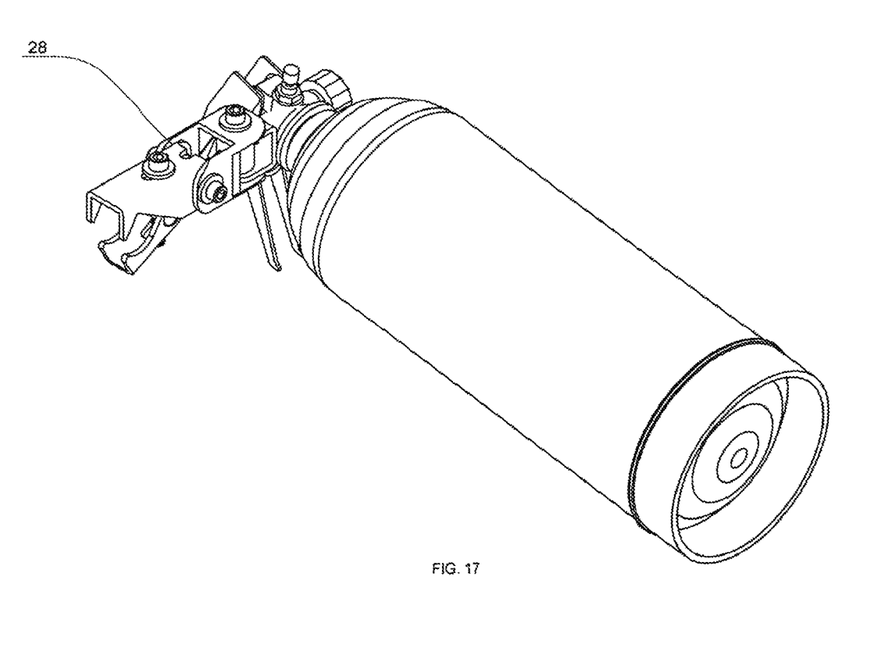
FIG. 17 illustrates the first embodiment of this clamp attached to a fire extinguisher.

The long fastening element 14 passes from the first jaw 15 to the second jaw 16 and through a moving jaw pivot pin 18 within the second jaw 16; the long fastening element 14 is perpendicular to the moving jaw pivot pin 18. The long fastening element 14 is between 1.0 inch and 12.0 inches in length and moves in connection with the moving jaw pivot pin 18. As best shown in FIG. 9, FIG. 12, and FIG. 13, the long fastening element 14 pivots in a direction limited by two similarly aligned cylindrical openings; a first opening 31 is located on the second jaw 16, and a second opening 32 is located on the first jaw 15. The openings 31, 32 are elongated, are about the same width as the long fastening element 14, and can be more than 1.0 inch in length. The long fastening element 14 is used to adjust the second jaw 16 so that it may hold or release one or more objects or accessories of varying shapes and thicknesses. Because the second jaw 16 is primarily opened or closed by adjusting the long fastening element 14, the second jaw 16 is considered a moving part and the first jaw 15 is considered a fixed or non-moving part.

Typically, the first jaw 15 and second jaw 16 are each between 0.10 of an inch and 1.0 inch thick. The second jaw 16 is smaller than the first jaw 15, both in length and in width, and for this reason the second jaw 16 is able to nestle within the first jaw 15. The second jaw 16 may be between 5% and 50% smaller than the first jaw 15. Typically, the second jaw 16 is between 15% and 40% smaller than the first jaw 15. Most often, the second jaw 16 is between 20% and 30% smaller than the first jaw 15. The second jaw 16 is generally between 2.0 inches and 12.0 inches wide. In some instances, the second jaw 16 is between 4.0 inches and 10.0 inches wide. Frequently, the second jaw 16 is between 6.0 inches and 8.0 inches wide.

Figure 8:
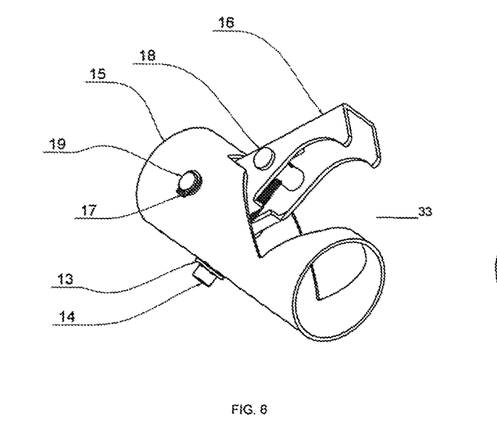
FIG. 8 depicts the second embodiment of this clamp.

As best shown in FIG. 8 and FIG. 9, it is preferred that the first jaw 15 include two matching 90-degree notches, although any angle below 180 degrees may be appropriate, to accommodate grasping edges, such as those found on rectangular or square shaped objects or accessories; and, it is preferred that the second jaw 16 include two matching curved surfaces to accommodate grasping objects or accessories which lack edges, such as cylindrical or circular objects or accessories.

The radius of the curvature of the second jaw 16 is generally between 1.0 inch and 6.0 inches; most often, the radius is between 2.0 inches and 5.0 inches. Preferably the radius of the curvature of the second jaw 16 is between 3.0 inches and 4.0 inches. The radius or diameter of the curvature of the second jaw 16 roughly limits the radius or diameter of the cylindrical or circular accessory or object that the clamp 33 may hold. For example: if the radius of the curvature of the second jaw 16 is 2.0 inches, then the clamp 33 may hold a cylindrical or circular accessory or object with a radius of 2.0 inches or less. As shown in FIG. 12, FIG. 13, FIG. 14, FIG. 15, and FIG. 16, the clamp 33 may hold rectangular or cylindrical objects of varying dimensions.

The second jaw 16 may include a plurality of teeth or rounded points at the edge of the jaw 16 that is furthest from the center of the clamp 33. The second jaw 16 generally includes two teeth or rounded points, but may have fewer or more as deemed necessary or beneficial for the clamp 33 to grasp and hold an accessory, object, or other components. The notches of first jaw 15 and the teeth of the second jaw 16 may optionally include a rubber coating or cover to improve the grip of the jaws 15, 16.

The first jaw 15 is connected to the second jaw 16 by the long fastening element 14, and is further connected to the second jaw 16 by a tube pivot pin 19. The second jaw 16 moves or pivots from the tube pivot pin 19. It is preferred that a retaining ring 17 rests between each end of the tube pivot pin 19 and the external surfaces of the first jaw 15. The tube pivot pin 19 is perpendicular to the long fastening element 14 and is approximately centered within the first jaw 15.

This clamp 33 is designed to hold and carry one or more objects, accessories, or components weighing a total of up to 200 pounds. More specifically, the clamp 33 is intended to hold and carry one or more objects, accessories, or components weighing between 70 pounds and 150 pounds in total. Most specifically, this clamp 33 is intended to hold and carry one or more objects, accessories, or components weighing between 85 pounds and 100 pounds. By increasing or decreasing the dimensions of this clamp 33, it is possible that the clamp 33 would be able to hold and carry one or more objects, accessories, or components having total weights outside of the aforementioned listed ranges. Multiple clamps 33 may be used to hold and carry objects, accessories, or components weighing more than the carrying capacity of a single clamp 33.

While certain representative embodiments and details have been shown for the purpose of illustrating the subject accessory clamp system, it will be apparent to those skilled in this art that various changes and modifications can be made therein without departing from the scope of the subject accessory clamp system.

What is claimed is:

1. A clamp system comprising:
   (i) a first jaw having two matching notched edges and a first cylindrical opening;
   (ii) a second jaw having two matching curved edges and a second cylindrical opening; wherein the width of the second jaw is less than the width of the first jaw;
   (iii) a moving jaw pivot pin within the second jaw;
   (iv) a long fastening element; wherein the long fastening element extends through the first cylindrical opening of the first jaw, through the moving jaw pivot pin, and through the second cylindrical opening of the second jaw; wherein the long fastening element operates the second jaw;
   (v) a compound swivel;
   (vi) a primary affixing element; wherein the primary affixing element is connected to the compound swivel; and, a secondary affixing element; wherein the secondary affixing element is connected to the primary affixing element;
   (vii) a compound knuckle having a first engaging surface, a second engaging surface, a third engaging surface, and a fourth engaging surface; wherein the width of the compound knuckle is greater than both the width of the compound swivel and the width of the first jaw;
   (viii) a first compound knuckle pivot pin; wherein the compound swivel and the first compound knuckle pivot pin are connected to the first engaging surface and to the second engaging surface of the compound knuckle by a plurality of short fastening elements and, washers or rings;
   (ix) a spacer; wherein the spacer covers a portion of the first compound knuckle pivot pin; and,
   (x) a second compound knuckle pivot pin; wherein the first jaw, the second jaw, and the second compound knuckle pivot pin are connected to the third engaging surface and to the fourth engaging surface of the compound knuckle by a plurality of short fastening elements; and, washers or rings.

2. The clamp system as specified in claim 1, wherein the first jaw, the second jaw, the compound knuckle, and the compound swivel, are each between 0.10 of an inch thick and 1.0 inch thick.

3. The clamp system as specified in claim 1, wherein the first jaw is between 4.0 inches and 10.0 inches wide.

4. The clamp system as specified in claim 1, wherein the first jaw is between 6.0 inches and 8.0 inches wide.

5. The clamp system as specified in claim 1, wherein the width of the second jaw is between 5% and 50% less than the width of the second jaw.

6. The clamp system as specified in claim 1, wherein the width of the second jaw is between 20% and 30% less than the width of the second jaw.

7. The clamp system as specified in claim 1, wherein the two matching curved edges of the second jaw have a radius between 1.0 inch and 6.0 inches.

8. The clamp system as specified in claim 1, wherein the two matching curved edges of the second jaw have a radius between 2.0 inches and 5.0 inches.

9. The clamp system as specified in claim 1, wherein the two matching curved edges of the second jaw have a radius between 3.0 inches and 4.0 inches.

10. A clamp system comprising:
(i) a first jaw having two matching notched edges and a first cylindrical opening;
(ii) a second jaw having two matching curved edges and a second cylindrical opening; wherein the width of the second jaw is less than the width of the first jaw;
(iii) a moving jaw pivot pin within the second jaw;
(iv) a long fastening element; wherein the long fastening element extends through the first cylindrical opening of the first jaw, through the moving jaw pivot pin, and through the second cylindrical opening of the second jaw; wherein the long fastening element operates the second jaw;
(v) a compound swivel;
(vi) a primary affixing element; wherein, the affixing element is connected to the compound swivel;
(vii) a compound knuckle having a first engaging surface, a second engaging surface, a third engaging surface, and a fourth engaging surface; wherein the width of the compound knuckle is greater than both the width of the compound swivel and the width of the first jaw;
(viii) a first compound knuckle pivot pin; wherein the compound swivel and the first compound knuckle pivot pin are connected to the first engaging surface and to the second engaging surface of the compound knuckle by a plurality of short fastening elements and washers or rings;
(ix) a spacer; wherein the spacer covers a portion of the first compound knuckle pivot pin; and,
(x) a second compound knuckle pivot pin; wherein the first jaw, the second jaw, and the second compound knuckle pivot pin are connected to the third engaging surface and to the fourth engaging surface of the compound knuckle by a plurality of short fastening elements and washers.

11. The clamp system as specified in claim 1, wherein the first jaw, the second jaw, the compound knuckle, and the compound swivel, are each between 0.10 of an inch thick and 1.0 inch thick.

12. The clamp system as specified in claim 1, wherein the first jaw is between 4.0 inches and 10.0 inches wide.

13. The clamp system as specified in claim 1, wherein the first jaw is between 6.0 inches and 8.0 inches wide.

14. The clamp system as specified in claim 1, wherein the width of the second jaw is between 5% and 50% less than the width of the second jaw.

15. The clamp system as specified in claim 1, wherein the width of the second jaw is between 20% and 30% less than the width of the second jaw.

16. The clamp system as specified in claim 1, wherein the two matching curved edges of the second jaw have a radius between 1.0 inch and 6.0 inches.

17. The clamp system as specified in claim 1, wherein the two matching curved edges of the second jaw have a radius between 2.0 inches and 5.0 inches.

18. The clamp system as specified in claim 1, wherein the two matching curved edges of the second jaw have a radius between 3.0 inches and 4.0 inches.

* * * * *

UNITED STATES PATENT AND TRADEMARK OFFICE
CERTIFICATE OF CORRECTION

PATENT NO. : 10,228,002 B2
APPLICATION NO. : 15/701376
DATED : March 12, 2019
INVENTOR(S) : Fletcher et al.

Page 1 of 1

It is certified that error appears in the above-identified patent and that said Letters Patent is hereby corrected as shown below:

On the Title Page

Items (71) and (72) should read:
Robert Donald Fletcher

Signed and Sealed this
Seventh Day of January, 2020

Andrei Iancu
*Director of the United States Patent and Trademark Office*